Patented Feb. 23, 1932

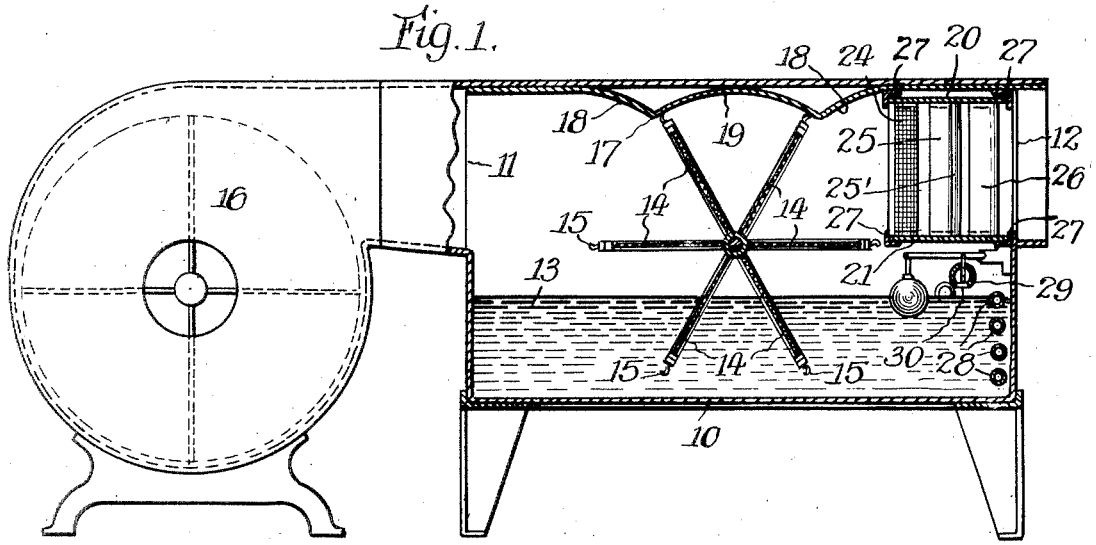
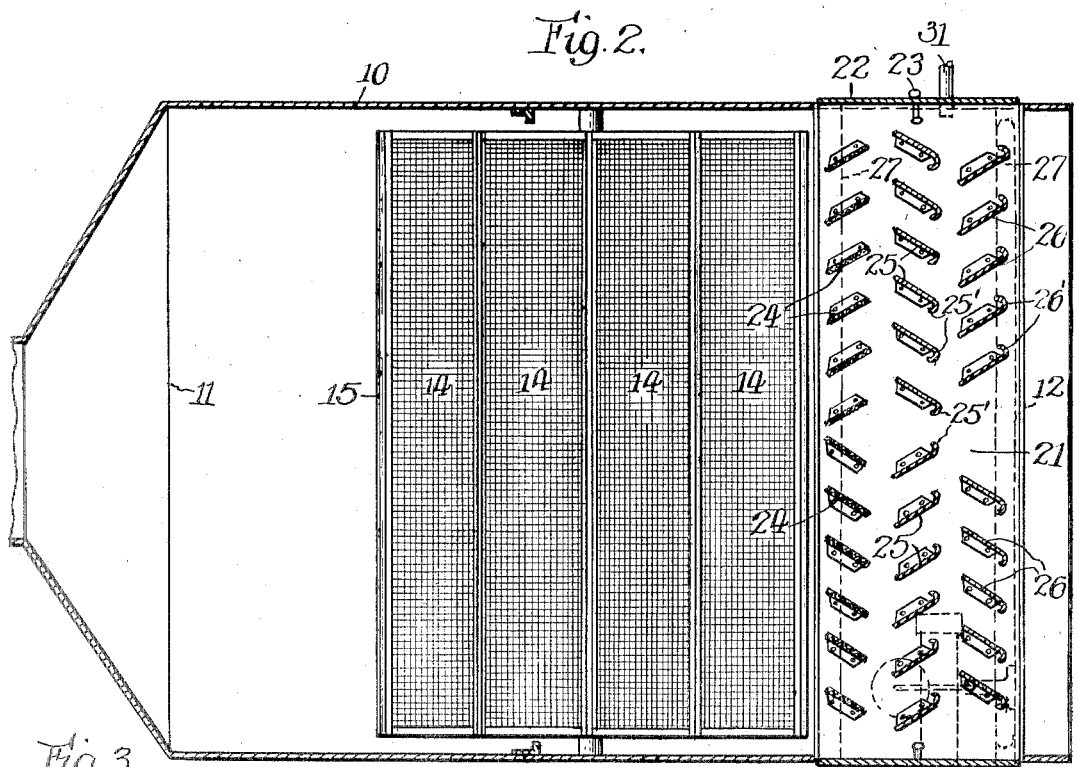
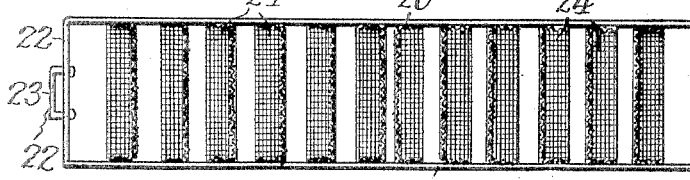

1,846,057

UNITED STATES PATENT OFFICE

ROBERT A. ILG, OF CHICAGO, ILLINOIS, ASSIGNOR TO ILG ELECTRIC VENTILATING COMPANY, OF CHICAGO, ILLINOIS, A CORPORATION OF LOUISIANA

AIR WASHER AND HUMIDIFIER

Application filed April 26, 1929. Serial No. 358,301.

This invention relates to devices for moistening and purifying air such as are quite commonly employed in connection with ventilating systems, and has reference more particularly to an air washer and humidifier of the general type disclosed in my former Letters Patent No. 1,309,737, dated July 15, 1919.

A general object of the present invention is to improve the device of my former patent by making it more efficient and perfect in its modifying effect on the air passed therethrough. More specific objects are, to provide a device that will more thoroughly eliminate dirt and excess moisture from the air, to provide a device that will permit the dirt and excess moisture eliminator to be optionally employed or omitted without involving any change or modification of the rest of the apparatus, and to provide a device wherein the dirt and excess moisture eliminator can be readily removed for cleaning as often as required.

Still other objects and attendant advantages of the invention will be apparent to persons skilled in the art as the same becomes better understood by reference to the following detailed description, taken in connection with the accompanying drawings in which I have illustrated one simple and practical embodiment of the invention, and wherein—

Fig. 1 is a vertical longitudinal section of the device, with the blower shown in side elevation;

Fig. 2 is an enlarged horizontal section through the tank and eliminator, with the paddle wheel appearing in top plan view;

Fig. 3 is a side elevation of the removable eliminator.

Referring to the drawings, 10 indicates as an entirety a rectangular box or tank, preferably of sheet-metal, that is open throughout substantially the upper half of its ends, as indicated at 11 and 12. The portion of the tank below the openings is designed to contain a body of liquid, preferably water, indicated at 13. Journaled in and between the side walls of the tank is a paddle wheel which includes a series of radial blades or paddles 14 carrying screens, the structural details of which are preferably like those shown and described in my former patent above referred to, including trough-shaped scoops 15 mounted on the outer edges of the paddle blades which, as the wheel revolves, pick up some of the water. As each blade approaches the vertical position, the water carried by the scoop thereof falls down and is distributed over the screen, thereby increasing the volume of water through which the air passes over that which merely adheres to the screen when passing through the water.

Mounted opposite one end of the tank 10 is a centrifugal blower 16, the discharge mouth of which registers with the opening 11 of the tank. Attached to the top wall of the tank is an air guide, in the form of a sheet-metal plate 17, that is pressed into the general form indicated in Fig. 1 and includes downwardly sloping end portions 18 and an intermediate concave portion 19 that is concentric with the axis of the paddle wheel, and is just cleared by the outer edges of the troughs 15 as the paddle wheel revolves, so as to compel substantially all of the air delivered by the blower to pass through the screens.

At the delivery end of the tank I provide a device which I term an eliminator, the purpose or function of which is to assist in cleaning the air of particles of dust and dirt which may fail to be washed out by the paddle screens, and also to free the air of excess moisture in the form of fine spray. This eliminator, which is preferably made removable to permit its optional use and facilitate cleaning thereof, may conveniently consist of a rectangular sheet-metal frame comprising top and bottom walls 20 and 21 (Fig. 3) and end walls 22, these latter being equipped with disappearing handles 23 to facilitate removal of the eliminator from either side of the tank. The eliminator is equipped with one or more longitudinal rows of vertically disposed baffles, all of which are disposed widthwise obliquely to the direction of flow of the air. I have herein shown an inner row of screen baffles 24, an intermediate row of solid sheet-metal baffles 25, and an outer row of solid sheet-metal baffles 26; but it is to be understood that the number of rows of baffles employed is entirely optional. It will further be observed by reference to Fig. 2 that the obliquity of the intermediate baffles 25 is opposed to that of the inner baffles 24, and the obliquity of the outer baffles 26 is opposed to that of the intermediate baffles 25. It will further be noted that the baffles of each row lying on opposite sides of the vertical median longitudinal plane of the tank are of opposite obliquity, with the baffles 26 of the outer row so disposed as to spread the air laterally of the tank as it emerges from the latter. Furthermore, to insure the baffle action on substantially all of the air flowing through the eliminator, the baffles of the intermediate and outer rows are staggered, so that air passing between the baffles 25 is caught and acted upon by the baffles 26. The baffle blades 25 and 26 are also preferably formed with rearwardly curled rear edges 25' and 26', as clearly shown in Fig. 2. The screen baffles 24 break up the fine spray carried along with the air, and the curled rear edges of the baffles 25 and 26 function as catchers for the spray and the dirt which works downwardly onto the bottom plate 21 of the eliminator frame. From time to time the frame may be removed and the baffles and bottom plate wiped free of dirt accumulations.

The eliminator frame may be supported in position within the tank by any suitable means such as angle slideways and guides 27 shown in Fig. 1.

I have also incorporated in the device a simple means for modifying the temperature of the air, the same consisting of a coil 28 preferably mounted crosswise of the rear end of the lower portion of the tank so as to be submerged by the water in the latter. When it is desired to warm the air, steam may be circulated through the coil 28; and when it is desired to cool the air, cold water or brine may be circulated through the coil. In both cases the temperature of the body of water is, of course, modified and this in turn modifies the temperature of the air.

For situations where a supply of water under pressure is conveniently available, I equip the tank with a water supply pipe 29 entering through a side wall of the tank below the eliminator, and provide a float-controlled valve 30 on said pipe which is automatically closed when the proper level of water in the tank is reached. To guard against an excess of water in the tank in the possible event of failure of the supply valve to function properly, or in the event that no automatic supply is used, I further equip the tank with an overflow pipe 31 entering the latter at the maximum level of the water.

I have herein shown and described an illustrative embodiment of the invention which will be found in practice to satisfactorily effectuate the stated purposes and objects thereof; but manifestly changes and modifications in structural details may be resorted to without departing from the principle of the invention, and hence I do not limit the latter to the exact form herein presented but reserve all such variations, modifications and mechanical equivalents as fall within the spirit and purview of the claims.

I claim—

1. In an air washer and humidifier, the combination of a tank adapted to contain a body of water, a paddle wheel formed with screen paddle blades journaled in and transversely of said tank and dipping into the water contained in the latter, an air propelling device communicating on its discharge side with one end of said tank, a row of screen baffles disposed across the path of the air current beyond said paddle wheel, each of said baffles being widthwise oblique to the direction of flow of the air, and a row of solid baffles beyond said screen baffles, said solid baffles being of opposite obliquity to said screen paddles.

2. In an air washer and humidifier, the combination of a tank adapted to contain a body of water, a paddle wheel formed with screen paddle blades journaled in and transversely of said tank and dipping into the water contained in the latter, an air propelling device communicating on its discharge side with one end of said tank, a row of screen baffles disposed across the path of the air current beyond said paddle wheel, and two rows of solid baffles beyond said screen baffles, said solid baffles lying widthwise oblique to the direction of flow of the air and the solid baffles of said two rows being of opposite obliquities and staggered relatively to each other.

3. In an air washer and humidifier, the combination of a tank adapted to contain a body of water, a paddle wheel formed with screen paddle blades journaled in and transversely of said tank and dipping into the water contained in the latter, an air propelling device communicating with one end of said tank above the water level, and a removable spray and dirt eliminator comprising a frame slidably mounted in and across the other end of said tank, and a plurality of rows of narrow baffles mounted vertically in said frame, said baffles being widthwise oblique to the direction of flow of air through said frame, and the baffles of the rear row being outwardly inclined from their front to their rear edges on opposite sides of the vertical longitudinal median plane of said tank.

4. In an air washer and humidifier, the combination of a tank adapted to contain a body of water, a paddle wheel formed with screen paddle blades journaled in and transversely of said tank and dipping into the water contained in the latter, an air propelling device communicating with one end of said tank above the water level, and a removable spray and dirt eliminator comprising a frame slidably mounted in and across the other end of said tank, and a plurality of rows of narrow baffles mounted vertically in said frame, said baffles being widthwise oblique to the direction of flow of air through said frame, and certain of said baffles having rearwardly curled rear edges serving as catchers for spray and dirt.

ROBERT A. ILG.